US007668174B1

(12) United States Patent
Patel et al.

(10) Patent No.: US 7,668,174 B1
(45) Date of Patent: Feb. 23, 2010

(54) METHODS AND APPARATUS FOR HOME ADDRESS MANAGEMENT AT HOME AGENT FOR NAI BASED MOBILE NODES

(75) Inventors: Alpesh Patel, Santa Clara, CA (US); Kent K. Leung, Mountain View, CA (US); Madhavi W. Chandra, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1011 days.

(21) Appl. No.: 10/273,705

(22) Filed: Oct. 17, 2002

(51) Int. Cl.
*H04L 12/56* (2006.01)
(52) U.S. Cl. ............... 370/395.3; 370/338; 370/474
(58) Field of Classification Search .......... 370/395.3, 370/338, 474
See application file for complete search history.

(56) References Cited

U.S. PATENT DOCUMENTS

| 6,430,698 | B1 * | 8/2002 | Khalil et al. ............... 714/4 |
| 6,510,153 | B1 * | 1/2003 | Inoue et al. ............... 370/354 |
| 7,461,169 | B2 * | 12/2008 | Chandra et al. ............ 709/245 |
| 2002/0085518 | A1 | 7/2002 | Lim ....................... 370/331 |
| 2004/0029584 | A1 * | 2/2004 | Le et al. .................. 455/432.1 |

FOREIGN PATENT DOCUMENTS

| EP | 0938217 A2 | 8/1999 |
| WO | 00/48363 | 8/2000 |
| WO | 00/79760 A1 | 12/2000 |
| WO | 01/72110 A2 | 10/2001 |
| WO | 01/93540 A1 | 12/2001 |

OTHER PUBLICATIONS

C. Perkings, Ed., *IP Mibility Support for Ipv4*, Aug. 2002, ftp://ftp.isi.edu/in-notes/rfc3344.txt.
International Search Report, Application No. PCU/US03/32958, Mailed Mar. 31, 2004; 4 pages.
Examiner's Communication pursuant to Article 96(2) EPC dated Nov. 29, 2005, for European Patent Application No. 03809114.6, Methods and Apparatus for Home Address Management At Home Agent For NAI Based Mobile Nodes, 6 pages.

(Continued)

*Primary Examiner*—Jason E Mattis
(74) *Attorney, Agent, or Firm*—Weaver Austin Villeneuve & Sampson LLP

(57) ABSTRACT

The present invention provides methods and apparatus for managing an IP address assigned to a Mobile Node. In one embodiment, the Mobile Node appends an extension to the registration request that is sent to its Home Agent, which indicates that the Mobile Node requests use of the IP address previously assigned to the Mobile Node for an additional period of time. When the Home Agent receives the registration request, it indicates whether a lease on the IP address previously assigned to the Mobile Node has been granted by the Home Agent for an additional period of time. In another embodiment, the Home Agent sends a first control message to determine whether the Mobile Node continues to use the IP address. The Home Agent then determines whether a second control message has been received in order to ascertain whether the Mobile Node continues to use the IP address previously assigned to the Mobile Node. The present invention is preferably performed when a Mobile Node returns to its home network, thereby enabling the Mobile Node to retain the IP address assigned to it.

43 Claims, 6 Drawing Sheets

OTHER PUBLICATIONS

European Office Action dated Apr. 23, 2007 from corresponding EP Application No. 03809114.6-1244, 6 pages.

Pete McCann and Kent Leung, "Mobile IP Session Identifier Extension." draft-ietf-mobileip-sessionid-00.txt, Mar. 2000, XP15032260, 7 pages.

Australian Office Action dated Jun. 10, 2008 from corresponding Australian Application No. 2003301496, 7 pgs.

First Chinese Office Action dated Sep. 19, 2008 from corresponding Application No. 200380101601.1, 30 pages.

Canadian Office Action dated Dec. 17, 2008 from corresponding Canadian Application No. 2,502,063, 5 oages.

Second Chinese Office Action dated Mar. 13, 2009 from corresponding Application No. 200380101601.1, 8 pages.

* cited by examiner

Mobility Binding Table 402

| NAI | Home address | Care-of address |
|---|---|---|
| 404 | 406 | 408 |
| | | |

FIG. 4

Address Management Table 502

| NAI | Home address | Source (e.g., AAA, DHCP, ODAP) | Lifetime | Timer |
|---|---|---|---|---|
| 504 | 506 | 508 | 510 | 512 |
| | | | | |

FIG. 5

METHODS AND APPARATUS FOR HOME ADDRESS MANAGEMENT AT HOME AGENT FOR NAI BASED MOBILE NODES

BACKGROUND OF THE INVENTION

1. Field of the Invention

The present invention relates to Mobile IP network technology. More particularly, the present invention relates to management of home addresses.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC3344, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R2 125. Router R2 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of-address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

The Mobile IP specification RFC3344 specifies that the Mobile Node be provisioned with its home address. This specification was enhanced with the use of a Network Address Identifier (NAI) in RFC 2794, Mobile IP Network Access Identifier Extension for IPv4, Calhoun et al., March 2000, which is incorporated herein by reference for all purposes. Specifically, the Mobile Node may be assigned a home address dynamically by the Home Agent when the Mobile Node registers with the NAI identifying the Mobile Node. For instance, the Mobile Node may register by providing the NAI in an extension to the registration request and setting the home address field of the registration request to a value of zero.

Under currently implemented NAI based solutions for dynamic home address assignment, when the Mobile Node returns to its home network, it hears the agent advertisement from the Home Agent and deregisters. The Home Agent then frees the home address for subsequent allocation to a Mobile Node. Unfortunately, although the Mobile Node continues to use the home address, the Home Agent is unaware that the Mobile Node continues using the home address and can potentially assign the home address to another Mobile Node. Similarly, the Mobile node has no way of determining that the Home Agent has assigned that address to another Mobile Node. As a result, the first Mobile Node may no longer receive packets addressed to it. Thus, the use of the NAI for dynamic address assignment imposes a problem of address management at the Home Agent when the Mobile Node returns back to its home network or boots up on its home network.

Typically, the Mobile Node does not return to its home network within service provider networks, and therefore the address management problem has not previously been addressed. However, the Mobile Node may return to its home network in an enterprise network.

In view of the above, it would be desirable to implement an improved mechanism for address management at Home Agent for NAI based mobile nodes.

SUMMARY OF THE INVENTION

The present invention provides methods and apparatus for managing addresses at Home Agents. This is particularly advantageous for Mobile Nodes that have been dynamically assigned a home address. In this manner, the Mobile Nodes may retain the IP address assigned to them when they return to their home network.

The present invention provides methods and apparatus for managing an IP address assigned to a Mobile Node. In one embodiment, the Mobile Node appends an extension to the registration request that is sent to its Home Agent, which indicates that the Mobile Node requests use of the IP address previously assigned to the Mobile Node for an additional period of time. When the Home Agent receives the registration request, it indicates whether a lease on the IP address previously assigned to the Mobile Node has been granted by the Home Agent for an additional period of time.

In another embodiment, the Home Agent sends a first control message to determine whether the Mobile Node continues to use the IP address. The Home Agent then determines whether a second control message has been received in order to ascertain whether the Mobile Node continues to use the IP address previously assigned to the Mobile Node.

In accordance with one aspect of the invention, the Home Agent maintains an address management table storing information about Mobile Nodes for which the IP addresses are managed at the Home Agent. An entry is created in the address management table (e.g., at least in part from the mobility binding table) when the Home Agent determines that an address is still in use. However, when the Home Agent determines that an IP address is no longer in use, the entry in the address management table is cleared and the IP address is released for allocation to a Mobile Node.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, registration request and reply packets having the format described herein and provided on appropriate media are part of this invention.

These and other features of the present invention will be described in more detail below in the detailed description of the invention and in conjunction with the following figures.

BRIEF DESCRIPTION OF THE DRAWINGS

FIG. 4 is a diagram illustrating an exemplary mobility binding table that may be updated in accordance with various embodiments of the invention.

FIG. 5 is a diagram illustrating an exemplary address management table storing temporary bindings in accordance with various embodiments of the invention.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

One standardized method for identifying users is proposed in RFC 2486 of the Network Working Group, January 1999, hereby incorporated by reference, which proposes syntax for the NAI, the userID submitted by a client during Point to Point Protocol (PPP) authentication. For instance, the mobile node may be configured with a NAI such as mn1@cisco.com. Thus, when a client is authenticated based upon the NAI, an IP address (i.e., Home Address) may be allocated for use by the client.

The present invention enables a Home Agent to manage addresses for Mobile Nodes having a dynamically assigned home address (and having a NAI). In this manner, the present invention solves the address management problems that may occur when a Mobile Node returns to its home network in an enterprise network.

Figure 1:
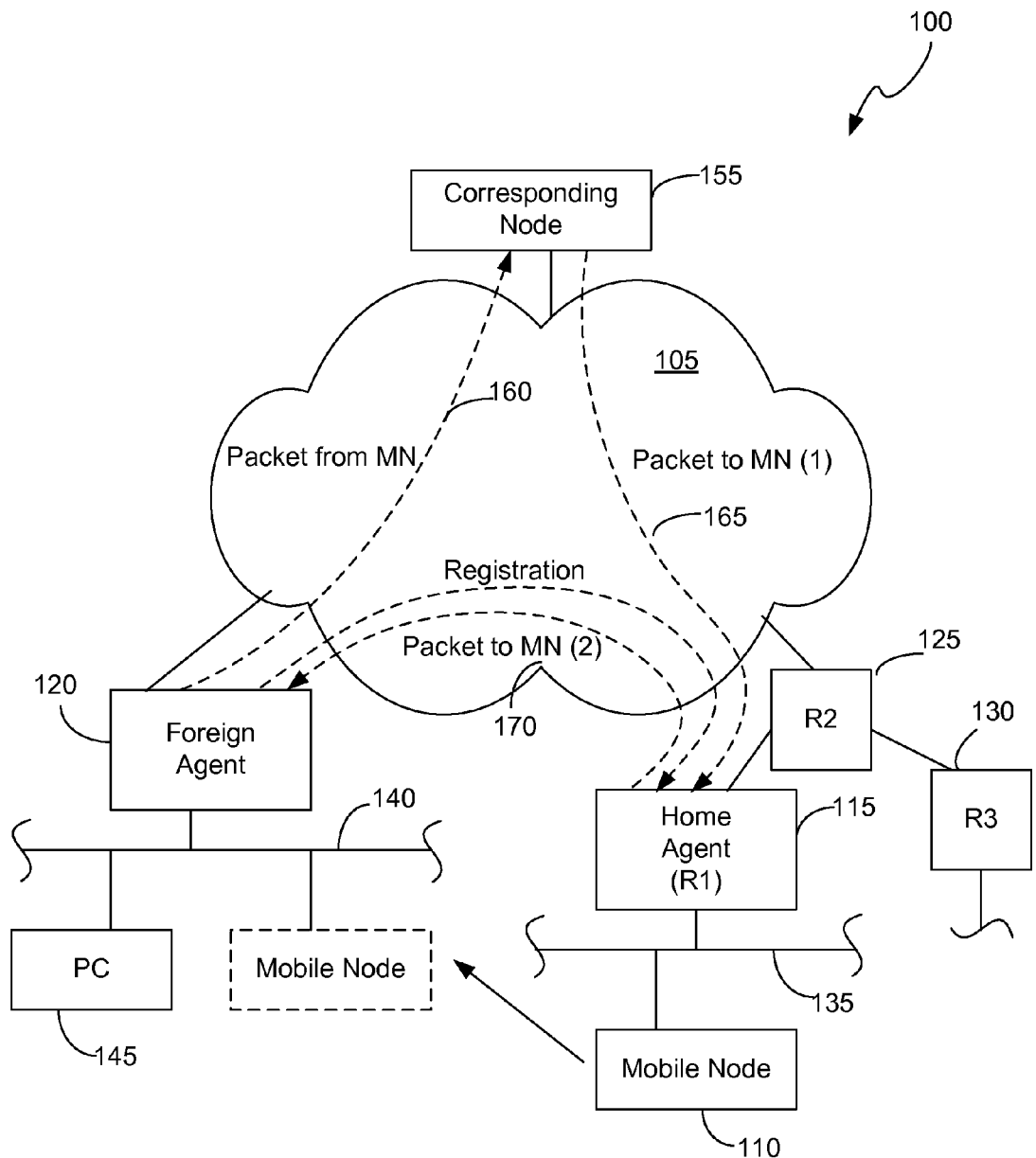
FIG. 1 is a block diagram of a Mobile IP environment.
Figure 2:
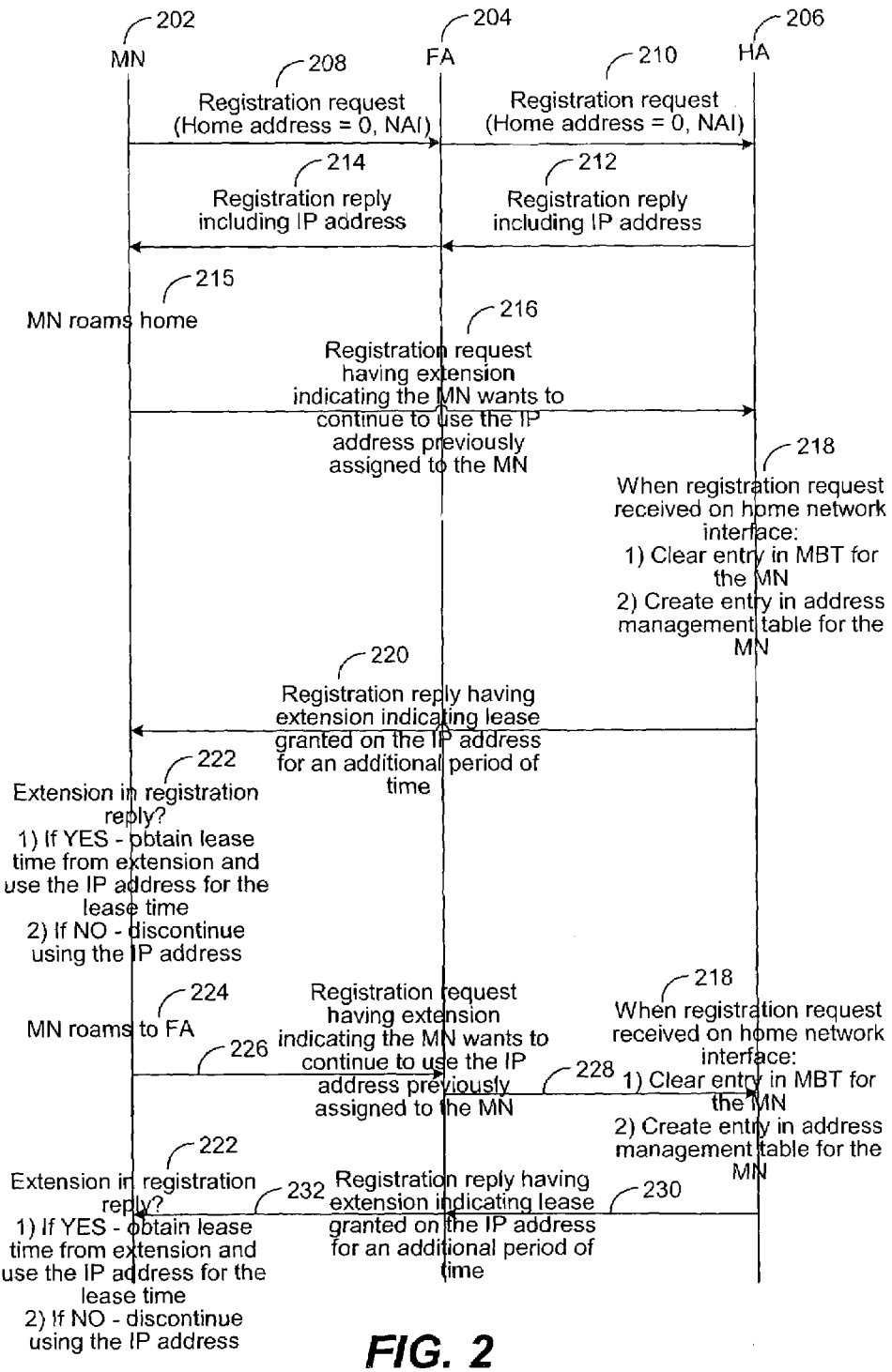
FIG. 2 is a process flow diagram illustrating a method of registering a Mobile Node in accordance with a first embodiment of the invention.

FIG. 2 is a process flow diagram illustrating a method of registering a Mobile Node in accordance with a first embodiment of the invention. Steps performed by the Mobile Node, Foreign Agent, and Home Agent are represented by vertical lines 202, 204, and 206, respectively. As described above, the Mobile Node is assigned an IP address dynamically. Thus, as shown at 208, the Mobile Node sends a registration request having a Home Address field set to zero and a NAI extension including a NAI assigned to the Mobile Node. An exemplary registration request will be described in further detail below with reference to FIG. 3A. The Foreign Agent forwards the registration request at 210 to the Home Agent. Upon receipt of the registration request, since the home address field is set to zero, the Home Agent recognizes that the Mobile Node needs a home address assignment. The Home Agent then assigns a home address to the Mobile Node identified by the NAI and sends a registration reply with the assigned IP address at 212 to the Foreign Agent. The Foreign Agent forwards the registration reply to the Mobile Node at 214.

When the Mobile Node roams home at 215, it composes a registration request having a home address field including the IP address previously assigned to the Mobile Node. In addition, the Mobile Node appends an extension to the registration request that indicates that the Mobile Node requests use of the IP address previously assigned to the Mobile Node for an additional period of time. In accordance with one embodiment, the registration request includes a lifetime field set to a value of zero, indicating that the registration request is a deregistration request. In addition, the extension to the registration request may also include a value and indicate that the Mobile Node requests use of the IP address previously assigned to the Mobile Node for a period of time equal to the value specified in the extension to the registration request. The Mobile Node then sends the registration request having the extension at 216 to a Home Agent associated with the Mobile Node.

When the Home Agent receives the registration request, it determines whether the registration request was received at an interface of the Home Agent that is an interface associated with a home network of the Mobile Node at 218. Specifically, the Home Agent determines whether the network prefix of the address of the interface of the Home Agent is the same as the network prefix of the IP address obtained from the home address field of the registration request. When the Home Agent has determined that the registration request was received at an interface of the Home Agent that is an interface associated with the home network of the Mobile Node, the Home Agent creates an entry for the Mobile Node in an address management table, as will be described in further detail below with reference to FIG. 5. The Home Agent may then manage the addresses stored in the address management table. In addition to updating the address management table, the Home Agent also clears the appropriate entry in its mobility binding table, as will be described in further detail below with reference to FIG. 4.

The Home Agent then composes and sends a registration reply to the Mobile Node at 220. The registration reply indicates whether a lease on the IP address previously assigned to the Mobile Node has been granted by the Home Agent for an additional period of time. In accordance with one embodiment, the registration reply includes an extension that indicates whether a lease on the IP address previously assigned to the Mobile Node has been granted by the Home Agent for the period of time equal to the value specified in the extension to the registration request. For instance, the extension to the registration reply may include a lease time that is less than or equal to the period of time equal to the value specified in the extension to the registration reply. As one example, the extension to the registration reply may specify a value of zero. An exemplary registration reply will be described in further detail below with reference to FIG. 3B. Of course, if the Home Agent is not configured with the software and/or hardware to perform address management and therefore does not understand the extension appended to the registration request, the Home Agent does not append an extension to the registration reply.

At 222 the Mobile Node receives the registration reply indicating whether a lease on the IP address previously assigned to the Mobile Node has been granted by the Home Agent for an additional period of time. As described above, the registration reply may or may not include an extension, depending upon whether the Home Agent is configured for home address management. Thus, the Mobile Node determines whether the registration reply includes an extension. When the Mobile Node determines that the registration reply does not include an extension, the Home Agent is not capable of managing the IP address previously assigned to the Mobile Node and the Mobile Node discontinues use of the IP address previously assigned to the Mobile Node. However, when the Mobile Node determines that the registration reply does include an extension, it determines from the extension whether a lease on the IP address previously assigned to the Mobile Node has been granted by the Home Agent for an additional period of time. As described above, the registration reply may indicate whether a lease has been granted for the period of time equal to the value specified in the extension to the registration request. For instance, a lease time that is less than or equal to the period of time equal to the value specified in the extension to the registration request may be specified in the extension to the registration reply. Thus, a lease time is obtained from the extension to the registration reply, thereby enabling the Mobile Node to use the IP address previously assigned to the Mobile Node for the lease time granted to the Mobile Node. If the lease time is equal to zero, the Mobile Node discontinues use of the IP address.

Figure 3A:
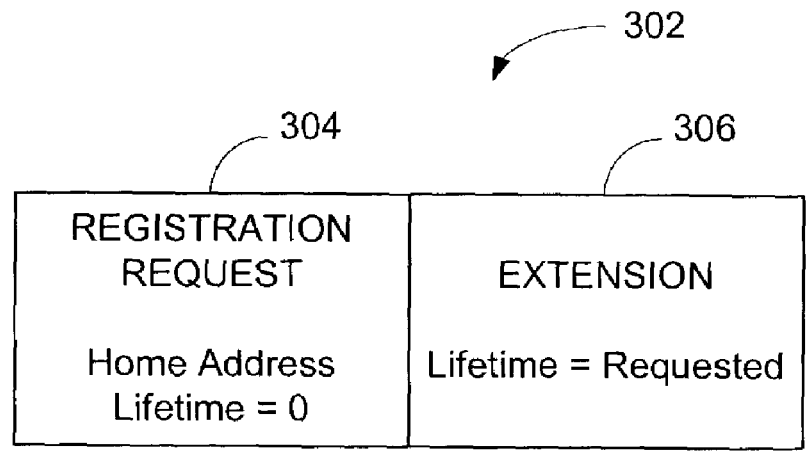
FIG. 3A is a diagram illustrating an exemplary registration request packet that is transmitted in accordance with the first embodiment of the invention.

FIG. 3A is a diagram illustrating an exemplary registration request packet that is transmitted in accordance with the first embodiment of the invention. The registration request 302 includes a registration request 304 and a vendor specific extension (VSE) 306 to the registration request 304. The registration request 304 preferably includes a lifetime equal to zero, indicating that the Mobile Node has returned/roamed to the Home Agent and is therefore "deregistering." In addition, a home address field includes the IP address previously assigned to the Mobile Node. As described above, the extension 306 indicates that the Mobile Node requests use of the IP address previously assigned to the Mobile Node for an additional period of time. While it is possible that a default value be assumed, the extension preferably includes a value equal to the lifetime requested. For instance, the value may be in seconds, minutes, etc.

Figure 3B:
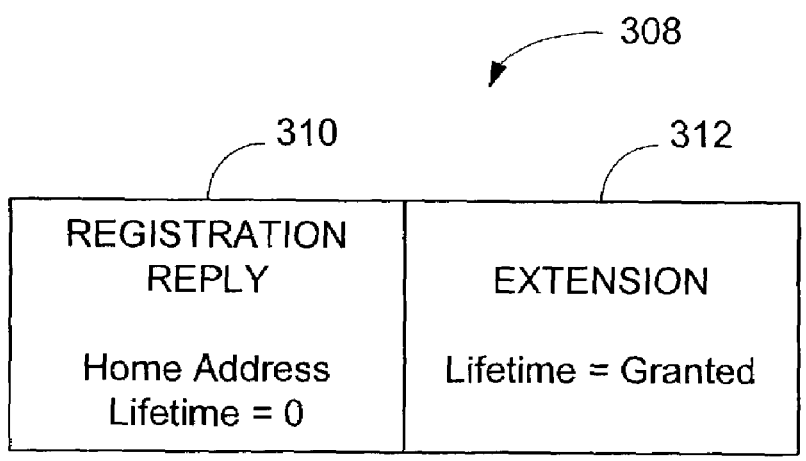
FIG. 3B is a diagram illustrating an exemplary registration reply packet that is transmitted in accordance with the first embodiment of the invention.

FIG. 3B is a diagram illustrating an exemplary registration reply packet that is transmitted in accordance with the first embodiment of the invention. The registration reply 308 includes a registration reply 310 and a VSE 312 to the registration reply 310. Since the registration request 304 included a lifetime of zero, the registration reply 310 also includes a lifetime equal to zero. The registration reply indicates whether a lease on the IP address previously assigned to the mobile Node has been granted by the Home Agent for an additional period of time (e.g., the value specified in the extension to the registration request). While the extension 312 may indicate that a default value or the lifetime requested has been granted, the extension 312 preferably specifies a lifetime that includes a lease time that is less than, equal to, or greater than that specified in the extension to the registration request.

FIG. 4 is a diagram illustrating an exemplary mobility binding table that may be updated in accordance with various embodiments of the invention. A mobility binding table 402 typically associates a Mobile Node with its care-of address. Thus, each entry in the mobility binding table 402 preferably identifies the Mobile Node via a NAI 404, home address 406, and care-of address 408.

FIG. 5 is a diagram illustrating an exemplary address management table storing temporary bindings in accordance with various embodiments of the invention. As shown, each entry optionally identifies the NAI 504 obtained from the mobility binding table in order to maintain a mapping between the NAI and the leased address, the home address 506, and an indicator 508 of a source from which the IP address was obtained. In addition, the entry also preferably specifies a lifetime 510 granted to the Mobile Node and a timer 512 indicating the amount of time remaining for use of the IP address. The source may be a AAA server, a DHCP (Dynamic Host Configuration Protocol) server, an On Demand Address Pool (ODAP), or local pool of addresses maintained by the Home Agent. AAA represents authentication, authorization, and accounting. Various protocols such as the Remote Authentication Dial In User Service (RADIUS) and TACACS+ may be implemented to provide such a server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

Since the source 508 of the IP address is identified in the address management table 502, the Home Agent is able to release the IP address to the source 508 for subsequent allocation to a Mobile Node (e.g., the same or a different Mobile Node). Moreover, the Home Agent may also communicate with the source 508 to extend the lifetime of the IP address as specified in the address management table 502.

The above-described embodiment requires that an additional extension be added to the registration request. In other words, this requires that modifications be made to the Mobile IP specifications. Moreover, in order to support these modifications, the Mobile Node is preferably modified. In the following description, an alternative embodiment is described which does not require that modifications be made to the Mobile IP specifications. As a result, the Home Agent communicates with the Mobile Node using control messages in order to ascertain whether to manage a particular IP address using an address management table such as that described above with reference to FIG. 5. For instance, control messages may be sent using the Address Resolution Protocol (ARP) or other suitable protocol.

Figure 6:
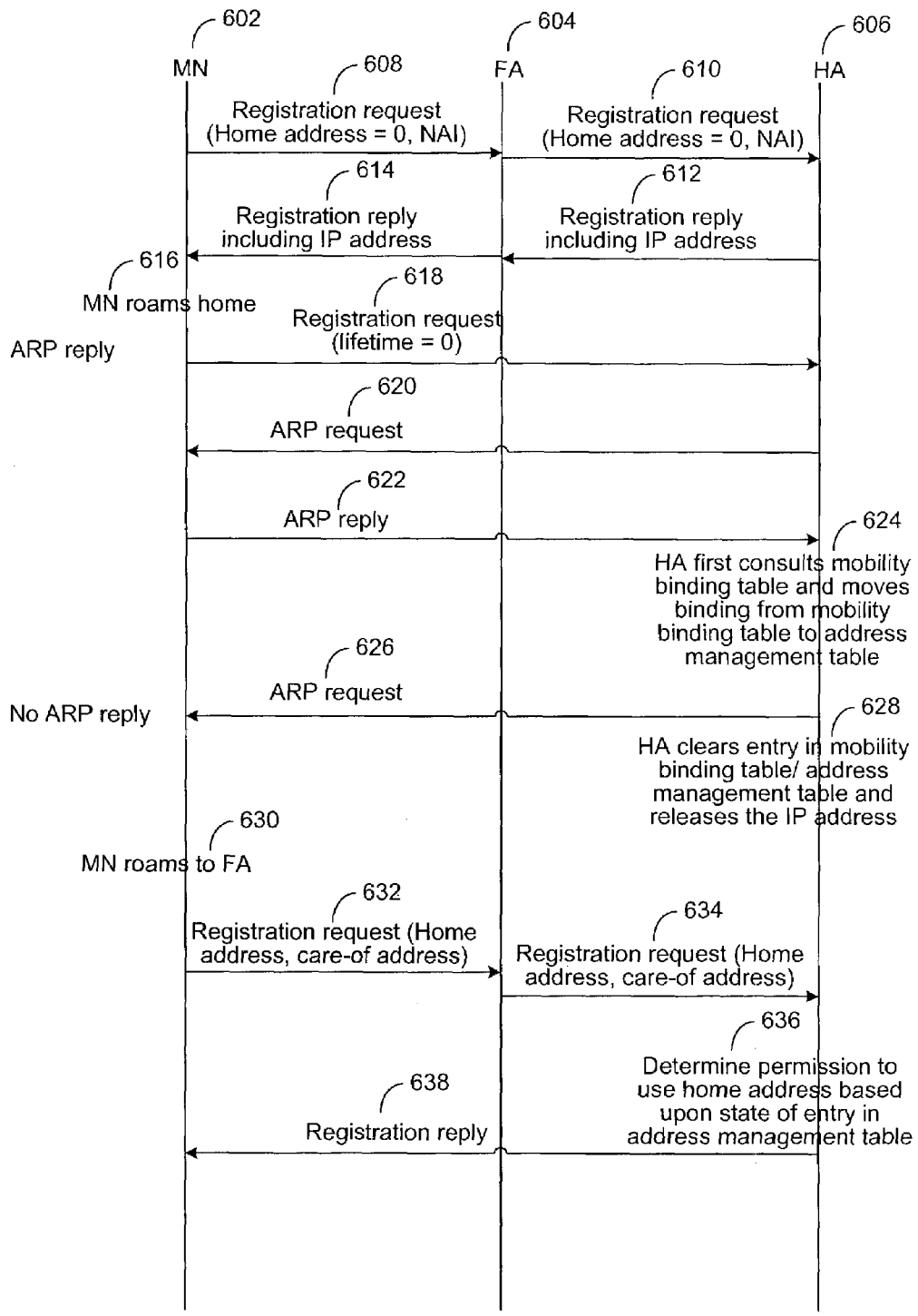
FIG. 6 is a process flow diagram illustrating a method of registering a Mobile Node in accordance with a second embodiment of the invention.

FIG. 6 is a process flow diagram illustrating a method of registering a Mobile Node in accordance with a second embodiment of the invention. Steps performed by the Mobile Node, Foreign Agent, and Home Agent are represented by vertical lines 602, 604, and 606, respectively. As described above, the Mobile Node is assigned an IP address dynamically. Thus, as shown at 608, the Mobile Node sends a registration request having a Home Address field set to zero and a NAI extension including a NAI assigned to the Mobile Node. An exemplary registration request will be described in further detail below with reference to FIG. 3A. The Foreign Agent forwards the registration request at 610 to the Home Agent. Upon receipt of the registration request, since the home address field is set to zero, the Home Agent recognizes that the Mobile Node needs a home address assignment. The Home Agent then assigns a home address to the Mobile Node identified by the NAI and sends a registration reply with the assigned IP address at 612 to the Foreign Agent. The Foreign Agent forwards the registration reply to the Mobile Node at 614.

When the Mobile Node roams home at 616, it composes a registration request having a home address field including the IP address previously assigned to the Mobile Node. In addition, the registration request preferably includes a lifetime field having a value of zero, as described above, thereby indicating to the Home Agent that the Mobile Node is deregistering. The Mobile Node then sends the registration request to the Home Agent at 618.

When the Home Agent receives a registration request including an IP address previously assigned to the Mobile Node (e.g., dynamically) and indicating that the registration request is a deregistration request, the Home Agent sends a first control message including the IP address previously assigned to the Mobile Node to determine whether the Mobile Node continues to use the IP address previously assigned to the Mobile Node. Specifically, in accordance with one embodiment, the first control message is an ARP request that is sent at 620 by the Home Agent to the IP address.

When the Mobile Node receives the first control message (e.g., ARP request), it sends a second control message (e.g., ARP reply) at 622 in reply to the Home Agent. Specifically, the ARP reply is addressed to the destination IP address as obtained from the source IP address of the ARP request. Although the ARP reply typically includes a MAC address assigned to the Mobile Node, the Home Agent merely interprets the receipt of the ARP reply as an indicator of whether the Mobile Node continues to use the IP address previously assigned to the Mobile Node. In other words, when the Home Agent receives an ARP reply, the Home Agent ignores the MAC address provided in the ARP reply for purposes of this invention.

The Home Agent preferably periodically sends a first control message such as an ARP request as described above. The Home Agent then determines whether a second control message such as an ARP reply has been received from the Mobile Node (identified by the IP address), where the second control message indicates whether the Mobile Node continues to use the IP address previously assigned to the Mobile Node. For instance, as described above, an ARP reply received from a particular IP address (e.g., source IP address) will indicate that the Mobile Node continues to use that IP address. Thus, when a second control message has not been received from the Mobile Node, the Home Agent determines that the Mobile Node is no longer using the IP address.

When the Home Agent receives a second control message from the Mobile Node indicating that the Mobile Node continues to use the IP address previously assigned to the Mobile Node, the Home Agent records information associated with the IP address, thereby enabling the Home Agent to manage the IP address. For instance, at 624 the Home Agent may first consult a mobility binding table as described above with reference to FIG. 4 and move the appropriate binding to an address management table such as that described above with reference to FIG. 5. Specifically, an entry for the Mobile Node is cleared from the mobility binding table and a corresponding entry is created in the address management table. In this manner, the Home Agent may release the IP address or extend the lifetime of the IP address.

As described above, the Home Agent periodically sends a first control message (e.g., ARP request) as shown at 626. For instance, the Home Agent may maintain a timer indicating an amount of time remaining until the Home Agent is to send a subsequent first control message. The timer is therefore periodically reset to a default period of time (e.g., seconds). As set forth above, a separate timer indicating an amount of time remaining in the lifetime of the IP address may be maintained by the Home Agent (e.g., in the address management table). When no second control message (e.g., ARP reply) is received by the Home Agent, the Home Agent concludes that the IP address is no longer in use. In other words, if the Mobile Node fails to respond to the ARP request a multiple of times, the Home Agent may release the IP address and clear the appropriate entry in the mobility binding table. The Home Agent therefore releases the IP address for use by a Mobile Node when the lifetime expires (e.g., as maintained in an address management table). The corresponding entry in the mobility binding table or address management table is then cleared at 628. In this manner, the Home Agent may release the IP address and discontinue its management of the IP address.

Assuming that the Mobile Node has responded with an ARP reply or other suitable control message and continues to use the IP address, the Mobile Node roams to a Foreign Agent at 630. The Mobile Node sends a registration request at 632 specifying the IP address as its home address and the Foreign Agent as its care-of address. When the Home Agent receives the registration request at 634, it checks to ensure that the requested home address matches the Mobile Node's address in the address management table at 636. If the Home Agent had cleared the address management table entry and released the home address, the Mobile Node does not have permission to use the home address. Otherwise, the Mobile Node gets the requested home address and the Home Agent moves the entry from the address management table to the mobility binding table. The Home Agent then sends a registration reply to the Mobile Node at 638 indicating whether registration using the requested home address is successful.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
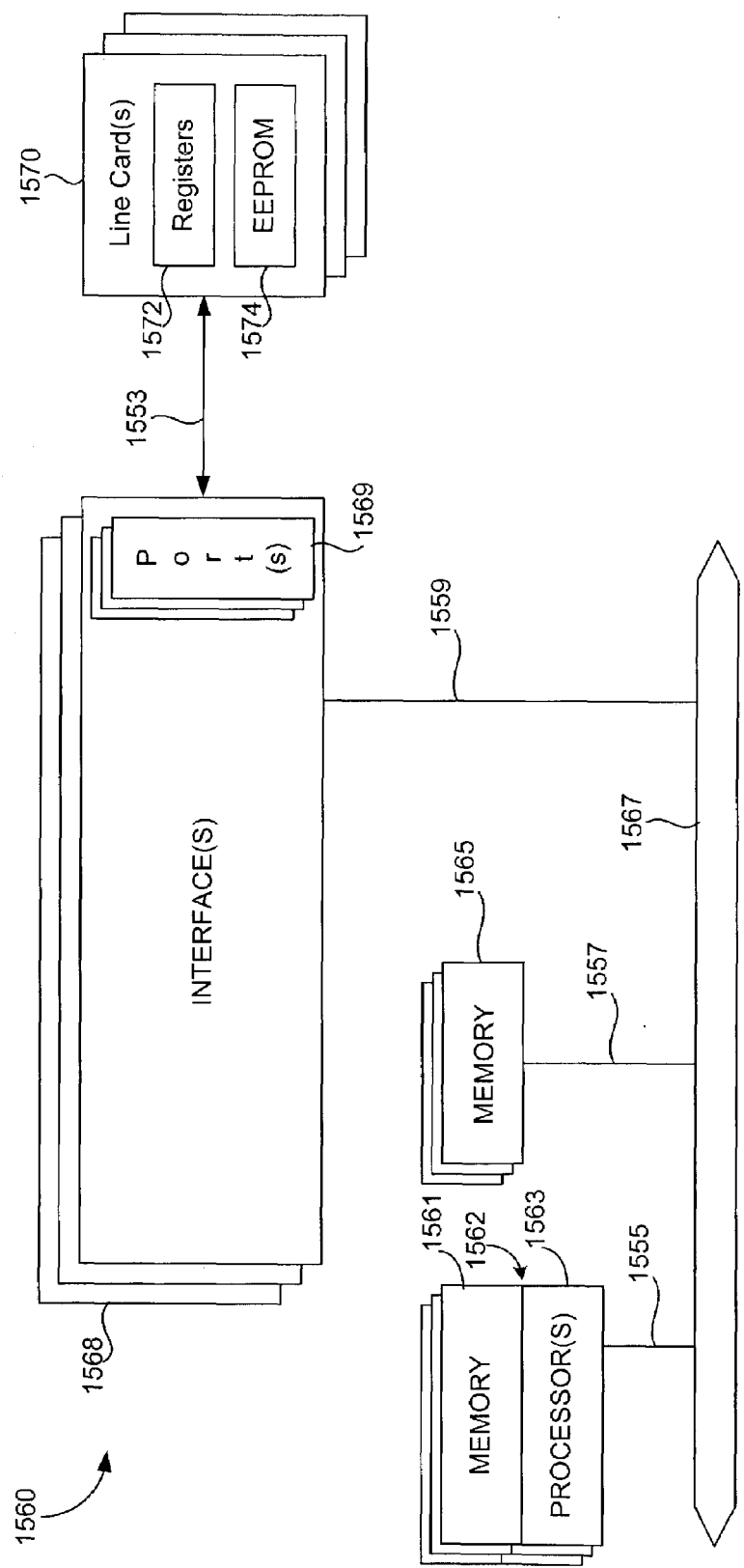
FIG. 7 is a diagram illustrating an exemplary network device in which various embodiments of the invention may be implemented.

Referring now to FIG. 7, a network device 1500 suitable for implementing the techniques of the present invention includes a master central processing unit (CPU) 1505, interfaces 1510, memory 1515 and a bus 1520. When acting under the control of appropriate software or firmware, the CPU 1505 may be responsible for implementing specific functions associated with the functions of a desired network device. For example, when configured as an intermediate router, the CPU 1505 may be responsible for analyzing packets, encapsulating packets, and forwarding packets for transmission to a set-top box. The CPU 1505 preferably accomplishes all these functions under the control of software including an operating system (e.g. Windows NT), and any appropriate applications software.

CPU 1505 may include one or more processors such as those from the Motorola family of microprocessors or the MIPS family of microprocessors. In an alternative embodiment, the processor is specially designed hardware for controlling the operations of network device 1500.

The interfaces 1510 are typically provided as interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 1505 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 1515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. In a Mobile Node supporting Mobile IP, a method of registering with a Home Agent, comprising:
    composing a registration request, the registration request having a home address field including an IP address previously assigned to the Mobile Node and having a lifetime field including a lifetime value, wherein the IP address is a home address of the Mobile Node;
    appending an extension to the registration request, the extension indicating that the Mobile Node requests use of the IP address previously assigned to the Mobile Node as the home address of the Mobile Node for an additional period of time;
    sending the registration request to a Home Agent associated with the Mobile Node; and
    receiving a registration reply from the Home Agent indicating whether a lease on the IP address previously assigned to the Mobile Node has been granted by the Home Agent for an additional period of time;
    wherein the extension to the registration request includes a value and indicates that the Mobile Node requests use of the IP address previously assigned to the Mobile Node for a period of time equal to the value specified in the extension to the registration request, wherein the value is independent of the lifetime value specified in the lifetime field of the registration request.

2. The method as recited in claim 1, wherein the registration reply includes an extension that indicates whether a lease on the IP address previously assigned to the Mobile Note has been granted by the Home Agent for the period of time equal to the value specified in the extension to the registration request.

3. The method as recited in claim 1, wherein the registration reply includes an extension that includes a lease time less than or equal to the period of time equal to the value specified in the extension to the registration request.

4. In a Mobile Node supporting Mobile IP, a method of registering with a Home Agent, comprising:
    composing a registration request, the registration request having a home address field including an IP address previously assigned to the Mobile Node, wherein the IP address is a home address of the Mobile Node;
    appending an extension to the registration request, the extension indicating that the Mobile Node requests use of the IP address previously assigned to the Mobile Node for an additional period of time;
    sending the registration request to a Home Agent associated with the Mobile Node;
    receiving a registration reply from the Home Agent indicating whether a lease on the IP address previously assigned to the Mobile Node has been granted by the Home Agent for an additional period of time;
    determining whether the registration reply includes an extension;
    when it is determined that the registration reply does not include an extension, the Home Agent is not capable of managing the IP address previously assigned to the Mobile Node and the Mobile Node discontinues using the IP address previously assigned to the Mobile Node; and
    when it is determined that the registration reply does include an extension, determining from the extension to the registration reply whether a lease on the IP address previously assigned to the Mobile Node has been granted by the Home Agent for an additional period of time.

5. The method as recited in claim 4, wherein determining from the extension to the registration reply whether a lease on the IP address previously assigned to the Mobile Node has been granted by the Home Agent for an additional period of time comprises obtaining a lease time from the extension to the registration reply, thereby enabling the Mobile Node to use the IP address previously assigned to the Mobile Node for the lease time granted to the Mobile Node.

6. The method as recited in claim 5, wherein when the lease time is equal to zero, discontinuing use of the IP address.

7. A computer-readable medium storing thereon computer-readable instructions for registering a Mobile Node supporting Mobile IP with a Home Agent, comprising:
    instructions for composing a registration request, the registration request having a home address field including an IP address previously assigned to the Mobile Node and having a lifetime field including a lifetime value, wherein the IP address is a home address of the Mobile Node;
    instructions for appending an extension to the registration request, the extension indicating that the Mobile Node requests use of the IP address previously assigned to the Mobile Node for an additional period of time;
    instructions for sending the registration request to a Home Agent associated with the Mobile Node; and
    instructions for receiving a registration reply from the Home Agent indicating whether a lease on the IP address previously assigned to the Mobile Node has been granted by the Home Agent for an additional period of time, wherein the extension to the registration request includes a value and indicates that the Mobile Node requests use of the IP address previously assigned to the Mobile Node for a period of time equal to the value specified in the extension to the registration request, wherein the value is independent of the lifetime value specified in the lifetime field of the registration request.

8. In a Mobile Node supporting Mobile IP, a method of registering with a Home Agent, comprising:
    composing a registration request, the registration request having a home address field including an IP address previously assigned to the Mobile Node and having a lifetime field including a lifetime value, wherein the IP address is a home address of the Mobile Node;
    appending an extension to the registration request, the extension indicating that the Mobile Node requests use of the IP address previously assigned to the Mobile Node as the home address of the Mobile Node for an additional period of time;
    sending the registration request to a Home Agent associated with the Mobile Node; and
    receiving a registration reply from the Home Agent indicating whether a lease on the IP address previously assigned to the Mobile Node has been granted by the Home Agent for an additional period of time;
    wherein the additional period of time for which the lease on the IP address has been granted is independent of the lifetime value specified in the lifetime field of the registration request.

9. The method as recited in claim 8, wherein a Mobile IP session is not established as a result of the registration request transmitted to the Home Agent.

10. The method as recited in claim 8, wherein the additional period of time for which the lease on the IP address has been granted extends a time during which the Mobile Node can use the IP address as the home address.

11. The method as recited in claim 8, wherein the extension indicates that the Mobile Node requests use of the IP address previously assigned to the Mobile Node as the home address for an additional period of time.

12. A Mobile Node supporting Mobile IP, the Mobile Node being configured for registering with a Home Agent, comprising:
   a processor; and
   a memory, at least one of the processor or the memory being configured for:
      composing a registration request, the registration request having a home address field including an IP address previously assigned to the Mobile Node and having a lifetime field including a lifetime value, wherein the IP address is a home address of the Mobile Node;
      appending an extension to the registration request, the extension indicating that the Mobile Node requests use of the IP address previously assigned to the Mobile Node as the home address of the Mobile Node for an additional period of time;
      sending the registration request to a Home Agent associated with the Mobile Node; and
      receiving a registration reply from the Home Agent indicating whether a lease on the IP address previously assigned to the Mobile Node has been granted by the Home Agent for an additional period of time;
   wherein the additional period of time for which the lease on the IP address has been granted is independent of a registration lifetime value specified in a lifetime field of the registration reply.

13. The Mobile Node as recited in claim 12, wherein the registration reply includes an extension that indicates whether a lease on the IP address previously assigned to the Mobile Node has been granted by the Home Agent for the additional period of time.

14. A Mobile Node supporting Mobile IP, the Mobile Node being configured for registering with a Home Agent, comprising:
   a processor; and
   a memory, at least one of the processor or the memory being configured for:
      composing a registration request, the registration request having a home address field including an IP address previously assigned to the Mobile Node and having a lifetime field including a lifetime value, wherein the IP address is a home address of the Mobile Node;
      appending an extension to the registration request, the extension indicating that the Mobile Node requests use of the IP address previously assigned to the Mobile Node as the home address of the Mobile Node for an additional period of time;
      sending the registration request to a Home Agent associated with the Mobile Node; and
      receiving a registration reply from the Home Agent indicating whether a lease on the IP address previously assigned to the Mobile Node has been granted by the Home Agent for an additional period of time;
   wherein the additional period of time for which the lease on the IP address has been granted is independent of a registration lifetime value specified in a lifetime field of the registration reply, wherein the registration lifetime value indicates a period during which the Mobile Node is registered with the Home Agent.

15. The Mobile Node as recited in claim 14, wherein the registration reply includes an extension that includes a lease time less than or equal to the additional period of time specified in the extension to the registration request.

16. A Mobile Node supporting Mobile IP, the Mobile Node being configured for registering with a Home Agent, comprising:
   a processor; and
   a memory, at least one of the processor or the memory being configured for:
      composing a registration request, the registration request having a home address field including an IP address previously assigned to the Mobile Node and having a lifetime field including a lifetime value, wherein the IP address is a home address of the Mobile Node;
      appending an extension to the registration request, the extension indicating that the Mobile Node requests use of the IP address previously assigned to the Mobile Node as the home address of the Mobile Node for an additional period of time;
      sending the registration request to a Home Agent associated with the Mobile Node; and
      receiving a registration reply from the Home Agent indicating whether a lease on the IP address previously assigned to the Mobile Node has been granted by the Home Agent for an additional period of time;
   wherein the additional period of time for which the lease on the IP address has been granted is independent of a registration lifetime value specified in a lifetime field of the registration reply, wherein the registration lifetime value indicates a length of a Mobile IP session associated with the Mobile Node.

17. In a Home Agent supporting Mobile IP, a method of registering a Mobile Node, comprising:
   receiving a registration request, the registration request having a home address field including an IP address previously assigned to the Mobile Node, a lifetime field including a lifetime value, and an extension to the registration request, the extension indicating that the Mobile Node requests use of the IP address previously assigned to the Mobile Node for an additional period of time, wherein the IP address is a home address of the Mobile Node;
   composing a registration reply; and
   sending the registration reply to the Mobile Node, the registration reply indicating whether a lease on the IP address previously assigned to the Mobile Node has been granted by the Home Agent for an additional period of time such that the Mobile Node can use the IP address as the home address of the Mobile Node for the additional period of time;
   wherein the additional period of time for which the lease on the IP address has been granted is independent of the lifetime value specified in the lifetime field of the registration request.

18. The method as recited in claim 17, wherein the extension to the registration request includes a value and indicates that the Mobile Node requests use of the IP address previously assigned to the Mobile Node for a period of time equal to the value specified in the extension to the registration request.

19. The method as recited in claim 18, further comprising:
   determining whether the IP address previously assigned to the Mobile Node has been released;
   wherein the registration reply indicates that a lease on the IP address previously assigned to the Mobile Node has been granted by the Home Agent for an additional period of time when it is determined that the IP address previously assigned to the Mobile Node has not been released; and wherein the registration reply indicates that a lease on the IP address previously assigned to the Mobile Node has not been granted by the Home Agent for an additional period of time when it is determined that the IP address previously assigned to the Mobile Node has been released.

20. The method as recited in claim 19, further comprising: moving an entry for the Mobile Node from an address management table to a mobility binding table when it is determined that the IP address previously assigned to the Mobile Node has not been released.

21. The method as recited in claim 18, wherein the lifetime value is set to zero, thereby indicating that the registration request is a deregistration request.

22. The method as recited in claim 18, wherein the lifetime value is set to zero, thereby indicating that the Mobile Node has roamed to the Home Agent.

23. The method as recited in claim 18, wherein the registration reply includes an extension that indicates whether a lease on the IP address previously assigned to the Mobile Node has been granted by the Home Agent for the period of time equal to the value specified in the extension to the registration request.

24. The method as recited in claim 18, wherein the registration reply includes an extension that includes a lease time less than or equal to the period of time equal to the value specified in the extension to the registration reply.

25. The method as recited in claim 18, wherein the registration reply does not include an extension.

26. The method as recited in claim 18, further comprising:
determining whether the registration request was received at an interface of the Home Agent that is an interface associated with a home network of the Mobile Node;
when it is determined that the registration request was received at an interface of the Home Agent that is an interface associated with the home network of the Mobile Node, creating an entry for the Mobile Node in an address management table.

27. The method as recited in claim 26, wherein determining comprises determining whether a network prefix of an address of the interface of the Home Agent is identical to a network prefix of the IP address obtained from the home address field of the registration request.

28. The method as recited in claim 26, wherein when it is determined that the registration request was received at an interface of the Home Agent that is an interface associated with the home network of the Mobile Node, the method further comprising:
clearing an entry in a mobility binding table for the Mobile Node, the mobility binding table associating the Mobile Node with a care-of address to which the Mobile Node has roamed.

29. The method as recited in claim 26, wherein creating an entry for the Mobile Node in the address management table comprises:
storing the IP address and an indicator of a source from which the IP address was obtained in the entry in the address management table, thereby enabling the Home Agent to extend the lease on the IP address or release the IP address to the source for subsequent allocation to a Mobile Node.

30. The method as recited in claim 29, further comprising:
storing the additional period of time requested by the Mobile Node for use of the IP address previously assigned to the Mobile Node; and
maintaining a timer indicating an amount of time remaining in the additional period of time requested by the Mobile Node.

31. The method as recited in claim 29, further comprising:
obtaining a NAI associated with the Mobile Node from a mobility binding table; and
storing the NAI associated with the Mobile Node in the entry in the address management table.

32. The method as recited in claim 17, wherein a Mobile IP session is not established as a result of the registration request received by the Home Agent.

33. The method as recited in claim 32, wherein the additional period of time for which the lease on the IP address has been granted is greater than zero.

34. The method as recited in claim 17, wherein the Home Agent does not establish a binding for the Mobile Node as a result of the registration request.

35. The method as recited in claim 17, wherein the additional period of time for which the lease on the IP address has been granted extends a time during which the Mobile Node can use the IP address as the home address.

36. A Home Agent supporting Mobile IP and adapted for registering a Mobile Node, comprising:
a processor; and
a memory, at least one of the processor or the memory being adapted for:
receiving a registration request, the registration request having a home address field including an IP address previously assigned to the Mobile Node, a lifetime field including a lifetime value, and an extension to the registration request, the extension indicating that the Mobile Node requests use of the IP address previously assigned to the Mobile Node for an additional period of time, wherein the IP address is a home address of the Mobile Node;
composing a registration reply; and
sending the registration reply to the Mobile Node, the registration reply indicating whether a lease on the IP address previously assigned to the Mobile Node has been granted by the Home Agent for an additional period of time such that the Mobile Node can use the IP address as the home address of the Mobile Node for the additional period of time;
wherein the additional period of time for which the lease on the IP address has been granted is independent of a registration lifetime value specified in a lifetime field of the registration reply.

37. The Home Agent as recited in claim 36, wherein the extension to the registration request includes a value and indicates that the Mobile Node requests use of the IP address previously assigned to the Mobile Node for a period of time equal to the value specified in the extension to the registration request.

38. The Home Agent as recited in claim 36, wherein the extension to the registration request includes a value and indicates that the Mobile Node requests use of the IP address previously assigned to the Mobile Node for a period of time equal to the value specified in the extension to the registration request, wherein the registration reply includes an extension that indicates whether a lease on the IP address previously assigned to the Mobile Node has been granted by the Home Agent for the period of time equal to the value specified in the extension to the registration request.

39. The Home Agent as recited in claim 36, wherein the registration reply includes an extension that includes a lease time less than or equal to the period of time equal to the value specified in the extension to the registration request.

40. A Home Agent supporting Mobile IP and adapted for registering a Mobile Node, comprising:
  a processor; and
  a memory, at least one of the processor or the memory being adapted for:
    receiving a registration request, the registration request having a home address field including an IP address previously assigned to the Mobile Node, a lifetime field including a lifetime value, and an extension to the registration request, the extension indicating that the Mobile Node requests use of the IP address previously assigned to the Mobile Node for an additional period of time, wherein the IP address is a home address of the Mobile Node;
    composing a registration reply; and
    sending the registration reply to the Mobile Node, the registration reply indicating whether a lease on the IP address previously assigned to the Mobile Node has been granted by the Home Agent for an additional period of time such that the Mobile Node can use the IP address as the home address of the Mobile Node for the additional period of time;
  wherein the additional period of time for which the lease on the IP address has been granted is independent of a registration lifetime value specified in a lifetime field of the registration reply, wherein the registration lifetime value indicates a period during which the Mobile Node is registered with the Home Agent.

41. A Home Agent supporting Mobile IP and adapted for registering a Mobile Node, comprising:
  a processor; and
  a memory, at least one of the processor or the memory being adapted for:
    receiving a registration request, the registration request having a home address field including an IP address previously assigned to the Mobile Node, a lifetime field including a lifetime value, and an extension to the registration request, the extension indicating that the Mobile Node requests use of the IP address previously assigned to the Mobile Node for an additional period of time, wherein the IP address is a home address of the Mobile Node;
    composing a registration reply; and
    sending the registration reply to the Mobile Node, the registration reply indicating whether a lease on the IP address previously assigned to the Mobile Node has been granted by the Home Agent for an additional period of time such that the Mobile Node can use the IP address as the home address of the Mobile Node for the additional period of time;
  wherein the additional period of time for which the lease on the IP address has been granted is independent of a registration lifetime value specified in a lifetime field of the registration reply, wherein the registration lifetime value indicates a length of a Mobile IP session associated with the Mobile Node.

42. A Mobile Node supporting Mobile IP, the Mobile Node being adapted for registering with a Home Agent, comprising:
  a processor; and
  a memory, at least one of the processor or the memory being adapted for:
    composing a registration request, the registration request having a home address field including an IP address previously assigned to the Mobile Node, wherein the IP address is a home address of the Mobile Node;
    appending an extension to the registration request, the extension indicating that the Mobile Node requests use of the IP address previously assigned to the Mobile Node for an additional period of time;
    sending the registration request to a Home Agent associated with the Mobile Node;
    receiving a registration reply from the Home Agent indicating whether a lease on the IP address previously assigned to the Mobile Node has been granted by the Home Agent for an additional period of time;
    determining whether the registration reply includes an extension;
    when it is determined that the registration reply does not include an extension, the Home Agent is not capable of managing the IP address previously assigned to the Mobile Node and the Mobile Node discontinues using the IP address previously assigned to the Mobile Node; and
    when it is determined that the registration reply does include an extension, determining from the extension to the registration reply whether a lease on the IP address previously assigned to the Mobile Node has been granted by the Home Agent for an additional period of time.

43. A Mobile Node supporting Mobile IP, the Mobile Node being adapted for registering with a Home Agent, comprising:
  a processor; and
  a memory, at least one of the processor or the memory being adapted for:
    composing a registration request, the registration request having a home address field including an IP address previously assigned to the Mobile Node, wherein the IP address is a home address of the Mobile Node;
    appending an extension to the registration request, the extension indicating that the Mobile Node requests use of the IP address previously assigned to the Mobile Node for an additional period of time;
    sending the registration request to a Home Agent associated with the Mobile Node;
    receiving a registration reply from the Home Agent indicating whether a lease on the IP address previously assigned to the Mobile Node has been granted by the Home Agent for an additional period of time;
    determining whether the registration reply includes an extension; and
    when it is determined that the registration reply does not include an extension, the Home Agent is not capable of managing the IP address previously assigned to the Mobile Node and the Mobile Node discontinues using the IP address previously assigned to the Mobile Node.

* * * * *

UNITED STATES PATENT AND TRADEMARK OFFICE
CERTIFICATE OF CORRECTION

PATENT NO. : 7,668,174 B1
APPLICATION NO. : 10/273705
DATED : February 23, 2010
INVENTOR(S) : Patel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1491 days.

Signed and Sealed this

Twenty-eighth Day of December, 2010

David J. Kappos
*Director of the United States Patent and Trademark Office*